United States Patent
Pappu et al.

(10) Patent No.: US 10,521,413 B2
(45) Date of Patent: Dec. 31, 2019

(54) LOCATION-BASED RECOMMENDATIONS USING NEAREST NEIGHBORS IN A LOCALITY SENSITIVE HASHING (LSH) INDEX

(71) Applicant: Yahoo! Inc., Sunnyvale, CA (US)

(72) Inventors: Aasish Pappu, New York, NY (US); Amanda Stent, New York, NY (US)

(73) Assignee: Oath Inc., New York, NY (US)

( * ) Notice: Subject to any disclaimer, the term of this patent is extended or adjusted under 35 U.S.C. 154(b) by 959 days.

(21) Appl. No.: 14/948,213

(22) Filed: Nov. 20, 2015

(65) Prior Publication Data
US 2017/0147575 A1    May 25, 2017

(51) Int. Cl.
| | | |
|---|---|---|
| *G06F 16/29* | (2019.01) | |
| *G06F 16/22* | (2019.01) | |
| *G06F 3/0482* | (2013.01) | |
| *G06F 16/248* | (2019.01) | |
| *G06F 16/9537* | (2019.01) | |

(52) U.S. Cl.
CPC ........ *G06F 16/2255* (2019.01); *G06F 3/0482* (2013.01); *G06F 16/248* (2019.01); *G06F 16/29* (2019.01); *G06F 16/9537* (2019.01)

(58) Field of Classification Search
CPC .. G06F 17/30241; G06F 16/29; G06F 16/387; G06F 16/487; G06F 16/587; G06F 16/687; G06F 16/787; G06F 16/901; G06F 16/909
See application file for complete search history.

(56) References Cited

U.S. PATENT DOCUMENTS

| | | | | |
|---|---|---|---|---|
| 2003/0140309 A1* | 7/2003 | Saito | ................. | G06F 17/30616 715/259 |
| 2004/0103092 A1* | 5/2004 | Tuzhilin | ............ | G06F 17/30412 |
| 2010/0070334 A1* | 3/2010 | Monteverde | ...... | G06F 17/30241 705/14.58 |
| 2010/0111370 A1* | 5/2010 | Black | ................. | G06K 9/00369 382/111 |
| 2011/0035369 A1* | 2/2011 | Halasipuram | ..... | G06F 17/30474 707/720 |

* cited by examiner

*Primary Examiner* — Robert W Beausoliel, Jr.
*Assistant Examiner* — Nirav K Khakhar
(74) *Attorney, Agent, or Firm* — Cooper Legal Group, LLC

(57) ABSTRACT

Software for a website hosting short-text services creates an index of buckets for locality sensitive hashing (LSH). The software stores the index in an in-memory database of key-value pairs. The software creates, on a mobile device, a cache backed by the in-memory database. The software then uses a short text to create a query embedding. The software map the query embedding to corresponding buckets in the index and determines which of the corresponding buckets are nearest neighbors to the query embedding using a similarity measure. The software displays location types associated with each of the buckets that are nearest neighbors in a view in a graphical user interface (GUI) on the mobile device and receives a user selection as to one of the location types. Then the software displays the entities for the selected location type in a GUI view on the mobile device.

20 Claims, 7 Drawing Sheets

LOCATION-BASED RECOMMENDATIONS USING NEAREST NEIGHBORS IN A LOCALITY SENSITIVE HASHING (LSH) INDEX

BACKGROUND

Apps for a mobile device like a smartphone can use the geographic location/position of the mobile device as implicit input for a recommender system. Thus, for example, a homepage (or launcher) app might list the entities such as restaurants that are in the vicinity of the smartphone device.

The problem with such implicit input is that it might not reflect the present interests of the mobile device's user. So, for example, the homepage app might list restaurants when the user is actually more interested in motels at a particular point in time.

On the other hand, obtaining explicit input as to a mobile-device user's interests tends to be inconvenient for the user in terms of such things as time spent doing data entry.

Consequently, recommender systems based on implicit input from a mobile device remain an active area of research and experimentation.

SUMMARY

In an example embodiment, a processor-executed method is described. According to the method, software for a website hosting short-text services creates an index of a plurality of buckets for locality sensitive hashing (LSH). Each bucket includes word or phrase embeddings derived from a corpus of documents that describe entities associated with geographic locations. The software stores the index in an in-memory database of key-value pairs. And the software creates, on a mobile device, a cache backed by the in-memory database. The cache is also in-memory. The software then uses a short text to create a query embedding. The software maps the query embedding to corresponding buckets in the index and determines which of the corresponding buckets are nearest neighbors to the query embedding using a similarity measure. The software displays location types associated with each of the buckets that are nearest neighbors in a view graphical user interface (GUI) on the mobile device and receives a user selection as to one of the location types. Then the software displays the entities for the selected location type in a GUI view on the mobile device.

In another example embodiment, an apparatus is described, namely, computer-readable media which persistently store a program for a website hosting short-text services. The program creates an index of a plurality of buckets for locality sensitive hashing (LSH). Each bucket includes word or phrase embeddings derived from a corpus of documents that describe entities associated with geographic locations. The program stores the index in an in-memory database of key-value pairs. And the program creates, on a mobile device, a cache backed by the in-memory database. The cache is also in-memory. The program then uses a short text to create a query embedding. The program maps the query embedding to corresponding buckets in the cache and determines which of the corresponding buckets are nearest neighbors to the query embedding, using a similarity measure. The program displays location types associated with each of the buckets that are nearest neighbors in a view in a graphical user interface (GUI) on the mobile device and receives a user selection as to one of the location types. Then the software displays the entities for the selected location type in a GUI view on the mobile device.

Another example embodiment also involves a processor-executed method. According to the method, software for a website hosting short-text services creates an index of a plurality of buckets for locality sensitive hashing (LSH). Each bucket includes word or phrase embeddings derived, using a continuous distribution model, from a corpus of documents that describe entities associated with geographic locations. The software stores the index in an in-memory database of key-value pairs. And the software creates, on a mobile device, a cache backed by the in-memory database. The cache is also in-memory. The software then uses a short text to create a query embedding. The software maps the query embedding to corresponding buckets in the index and determines which of the corresponding buckets are nearest neighbors to the query embedding using cosine similarity, city-block similarity, or Euclidean similarity. The software displays location types associated with each of the buckets that are nearest neighbors in a view in a graphical user interface (GUI) on the mobile device and receives a user selection as to one of the location types. Then the software displays the entities for the selected location type in a GUI view on the mobile device.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
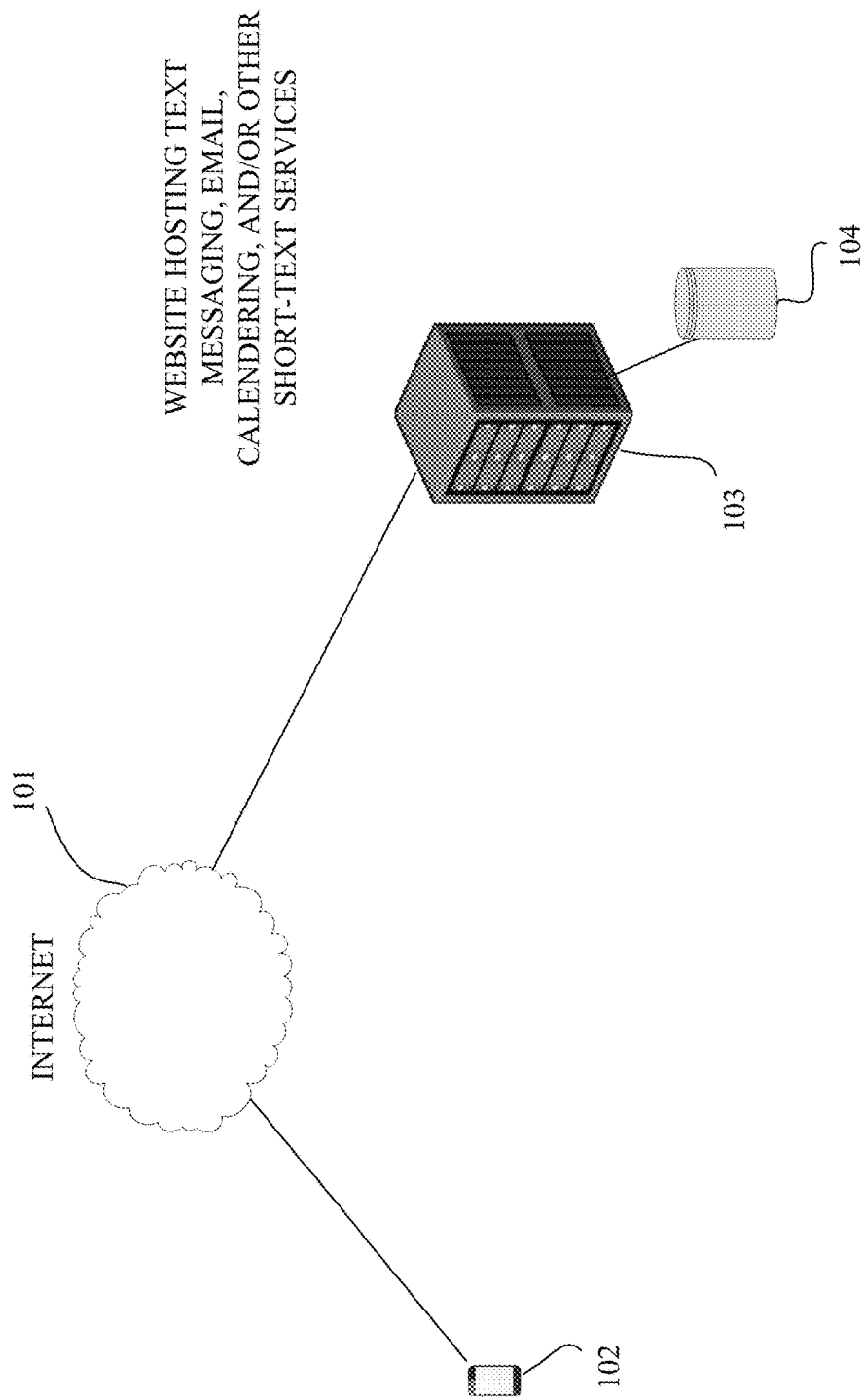
FIG. 1 is a network diagram showing a website providing short-text services to a mobile device, in accordance with an example embodiment.

FIG. 1 is a network diagram showing a website providing short-text services to a mobile device, in accordance with an example embodiment. As depicted in this figure, a mobile device 102 (e.g., a smartphone such as an iPhone, Android, Windows Phone, etc., a tablet computer such as an iPad, Galaxy, etc., or a laptop or other mobile personal computer) is connected by a network 101 (e.g., a wide area network (WAN) including the Internet, which might be wireless in part or in whole) to a website 103 hosting text messaging (e.g., instant messaging, direct messaging, etc.), email, event calendars, to-do lists, personal assistants, and/or other services involving short texts. In an example embodiment, website 103 might be a website such as Yahoo! or Google, which also hosts an online-content service (e.g., including a content-aggregation service) or a website such as Facebook which also hosts a social-networking service.

In an example embodiment, website 103 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Google Dremel, Google MillWheel, Apache Hadoop YARN, CloudBase, etc. The servers in website 103 might be connected to persistent storage 104. Persistent storage 104 might include flash memory, a redundant array of independent disks (RAID), and/or a storage area network (SAN), in an example embodiment. In an alternative example embodiment, the servers for websites 103 and/or the persistent storage in persistent storage 104 might be hosted wholly or partially in a public and/or private cloud, e.g., where the cloud resources serve as a platform-as-a-service (PaaS) or an infrastructure-as-a-service (IaaS).

Persistent storage 104 might be used to store text messages (e.g., instant messages, direct messages, etc.), email, event calendars, to-do lists, etc., as well as the locality sensitive hashing (LSH) index described below and its inputs, e.g., a corpus of documents such as Wikipedia, as text and/or string-vectors. In an example embodiment, persistent storage on mobile device 102 might also store text messages (e.g., instant messages, direct messages, etc.), email, event calendars, to-do lists, etc., and all or a portion of the LSH index described below.

Similarly, in an example embodiment, mobile device 102 might include (1) hardware consisting of one or more microprocessors (e.g., from the ARM family or the x86 family), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, and a global positioning system (GPS) or other location-identifying type capability. Similarly, the servers at website 103 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. If mobile device 102 is a laptop or other mobile personal computer, it might include the hardware and an operating system similar to the hardware and operating system described for the servers at website 103.

Also, in an example embodiment, mobile device 102 might include a browser as an application program or as part of an operating system. Examples of browsers that might execute on mobile device 102 include Safari, Mozilla Firefox, Android Browser, and webOS Browser. If mobile device 102 is a laptop or other mobile personal computer, example browsers might include Internet Explorer, Mozilla Firefox, Safari, and Google Chrome. It will be appreciated that users of mobile device 102 might use browsers to access the services hosted by website 103. Alternatively, users of mobile device 102 might use application programs (e.g., native apps, including hybrid apps that display HTML content) to access the services hosted by website 103.

Figure 2A:
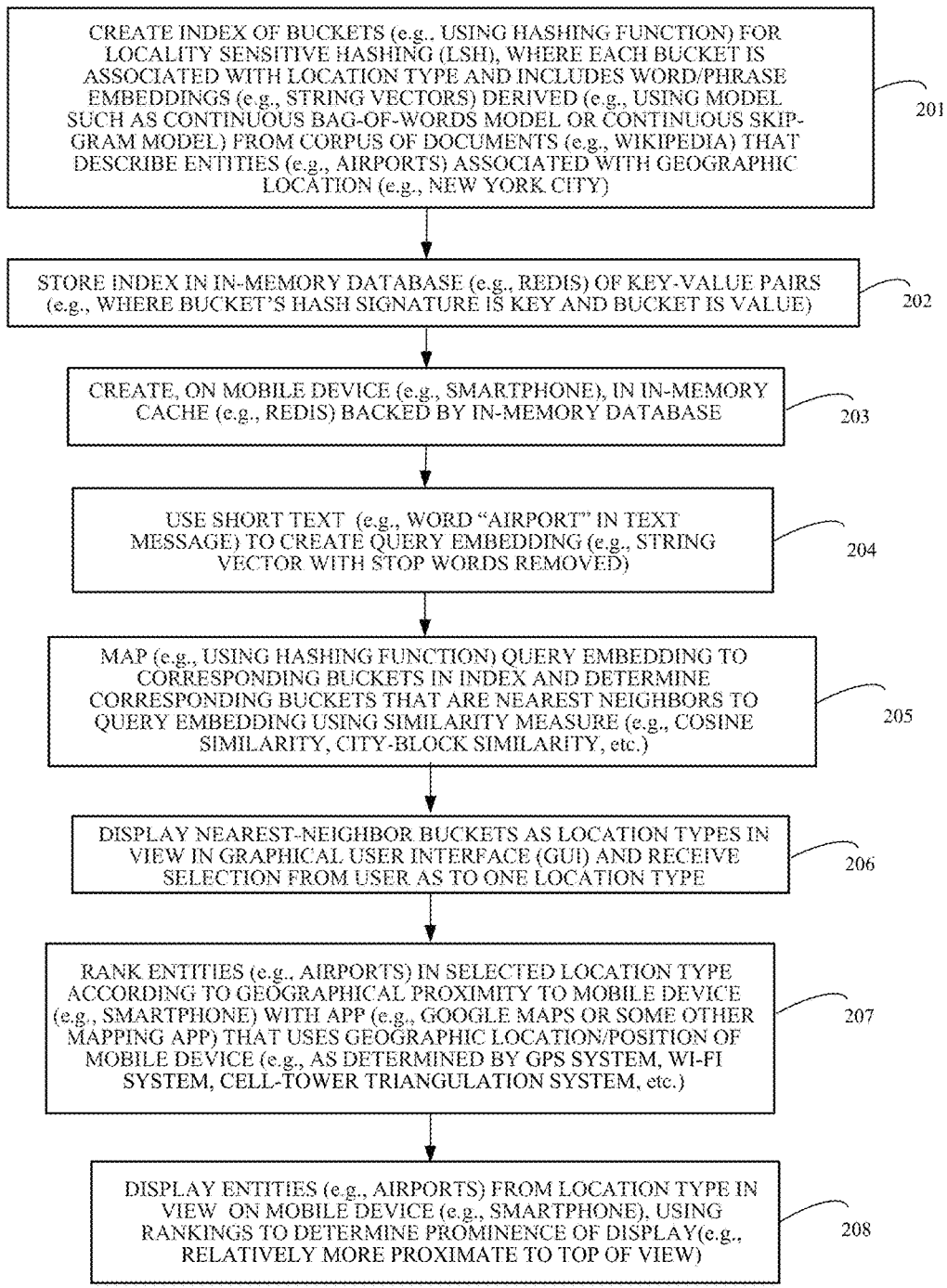
FIG. 2A is a flowchart diagram of a process for converting a short text to a query that is used to find corresponding entities in that geographic location using locality sensitive hashing (LSH), in accordance with an example embodiment.

FIG. 2A is a flowchart diagram of a process for converting a short text to a query embedding that is used to find corresponding entities in that geographic location using locality sensitive hashing (LSH), in accordance with an example embodiment. In an example embodiment, some or all of the operations shown in this figure might be performed by software running on servers at website 103 using persistent storage 104. Or, some or all of the operations shown in this figure might be performed by client software running on mobile device 102, including, for example, a webpage with embedded JavaScript (or ActionScript) or an application such as a native app.

As depicted in FIG. 2A, the software (e.g., the software running on servers at website 103) creates an index of buckets (e.g., using a hashing function that maps a vector of an arbitrary number of dimensions into an integer number) for locality sensitive hashing (LSH), in operation 201. In an example embodiment, each bucket might be associated with a location type and include word/phrase embeddings (e.g., string vectors) derived (e.g., using model such as continuous bag-of-words model or continuous skip-gram model) from a corpus of documents (e.g., Wikipedia) that describe entities (e.g., airports) associated with a geographic location (e.g., New York City). In operation 202, the software stores (e.g., the software running on servers at website 103) the index in an in-memory database (e.g., Redis) of key-value pairs (e.g., where the bucket's hash signature is the key and the bucket (e.g., a linked list of word/phrase embeddings) is the value) on the website's servers. The software (e.g., client software on the mobile device) creates an in-memory cache (e.g., Redis) on the mobile device backed by the in-memory database, in operation 203. And in operation 204, the software (e.g., client software on the mobile device) uses a short text (e.g., the word "airport" in a text message) to create a query embedding (e.g., a string vector with stop words removed). The software (e.g., client software on the mobile device) maps (e.g., using a hashing function that maps a vector of an arbitrary number of dimensions into an integer number) the query embedding to corresponding buckets in the index and determines which of the corresponding buckets are nearest neighbors to the query embedding using a similarity measure (e.g., cosine similarity, city-block similarity, etc.), in operation 205. In operation 206, the software (e.g., client software on the mobile device) displays the nearest-neighbor buckets as location types (e.g., as location types within the user's geographic area) in a view in graphical user interface (GUI) and receives a selection from the user as to one of the location types. And in operation 207, the software (e.g., client software on the mobile device) ranks the entities (e.g., airports) in the selected location type according to geographical proximity to the mobile device with an app (e.g., Google Maps or some other mapping app) that uses the geographic location/position of the mobile device (e.g., as determined by a GPS system, a Wi-Fi system, a cell-tower triangulation system, a hybrid-positioning system associated with the mobile device and/or its networks, a check-in app such as Foursquare, etc.). Then in operation 208, the software (e.g., client software on the mobile device) displays the entities (e.g., airports) from the selected location type in a GUI view on mobile device, using the rankings to determine prominence of display (e.g., with the highest-ranked entity relatively more proximate to the top of the view, followed by the next highest-ranked entity, etc.). It will be appreciated that the displayed entities are recommendations and that the software functions as a recommender system.

As noted above, the software creates an index of buckets (e.g., using a hashing function) for locality sensitive hashing (LSH), in operation 201. In an example embodiment, this operation might be performed offline, rather than in real-time or near real-time. Also, in an example embodiment, the software that performs this operation might include or be based on open-source software, e.g., JorenSix's TarsosLSH: Locality Sensitive Hashing in Java, which is maintained at GitHub. The configurable parameters for TarsosLSH include the hash signature for a bucket, number of buckets, and bucket size.

As additionally noted above, each bucket in the index might include word/phrase embeddings (e.g., string vectors) derived from a corpus of documents (e.g., Wikipedia or some other large corpus of documents). In an example embodiment, the word/phrase embeddings might be derived from the corpus of documents using a continuous bag-of-words (CBOW) model or a continuous skip-gram model, using, for example, open-source software, such as word2vec at Google Code, which is based on Mikolov et al., "Efficient Estimation of Word Representations in Vector Space" (Sep. 7, 2013) (hereafter "Mikolov"). Both the documentation for word2vec and Mikolov are incorporated herein by reference.

Figure 3:
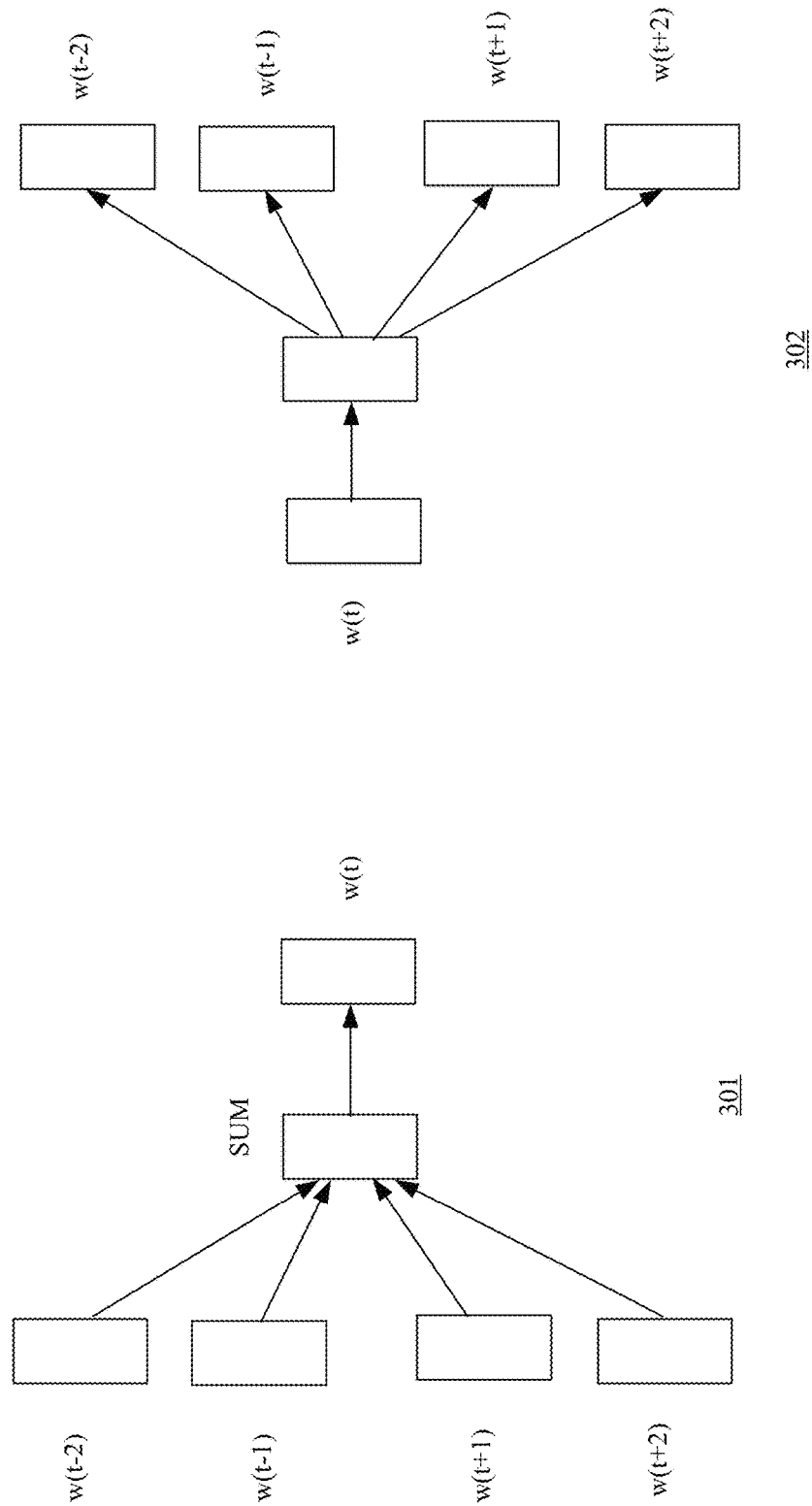
FIG. 3 depicts a continuous bag-of-words model and a continuous skip-gram model, in accordance with an example embodiment.

Diagram 301 in FIG. 3 illustrates the CBOW model, where a word (e.g., w(t)) is projected from an input context that consists of the words that precede (e.g., w(t−1)) and follow (e.g., w(t+1)) the word. And diagram 302 in FIG. 3 illustrates the continuous skip-gram model, where the preceding (e.g., w(t−1)) and following contextual words (e.g., w(t+1)) are projected from an input word (e.g., w(t)).

In operation 204, the software uses a short text (e.g., the word "airport" in a text message) to create a query embedding. In an example embodiment, the short text might be a noun-phrase chunk parsed or otherwise obtained from a text message (e.g., instant message, direct message, etc.), email, calendar event, to-do list, etc., generated in connection with the short-text services hosted by website 103. To create a query embedding (e.g., a string vector) from the noun-phrase chunk, the software might use word2vec, in an example embodiment.

In operation 205, the software maps (e.g., using a hashing function) the query embedding to corresponding buckets in the index and determines which of the corresponding buckets are nearest neighbors to the query embedding using a similarity measure. TarsosLSH supports the use of three different similarity (or distance) metrics for nearest neighbor search: (a) cosine similarity; (b) city-block (or Manhattan) similarity, and (c) Euclidean similarity. See the TarsosLSH API Documentation, which is incorporated herein by reference. One or more of these similarity measures might be used in operation 205. It will be appreciated here that Jaccard similarity has been proven to be logically equivalent to cosine similarity; consequently, Jaccard similarity might also be used in operation 205. TarsosLSH also allows the selection of a radius to be used in the nearest-neighbor search, e.g., the "k" value in k-nearest neighbor search. In an example embodiment, such a radius might be used in operation 205.

Figure 2B:
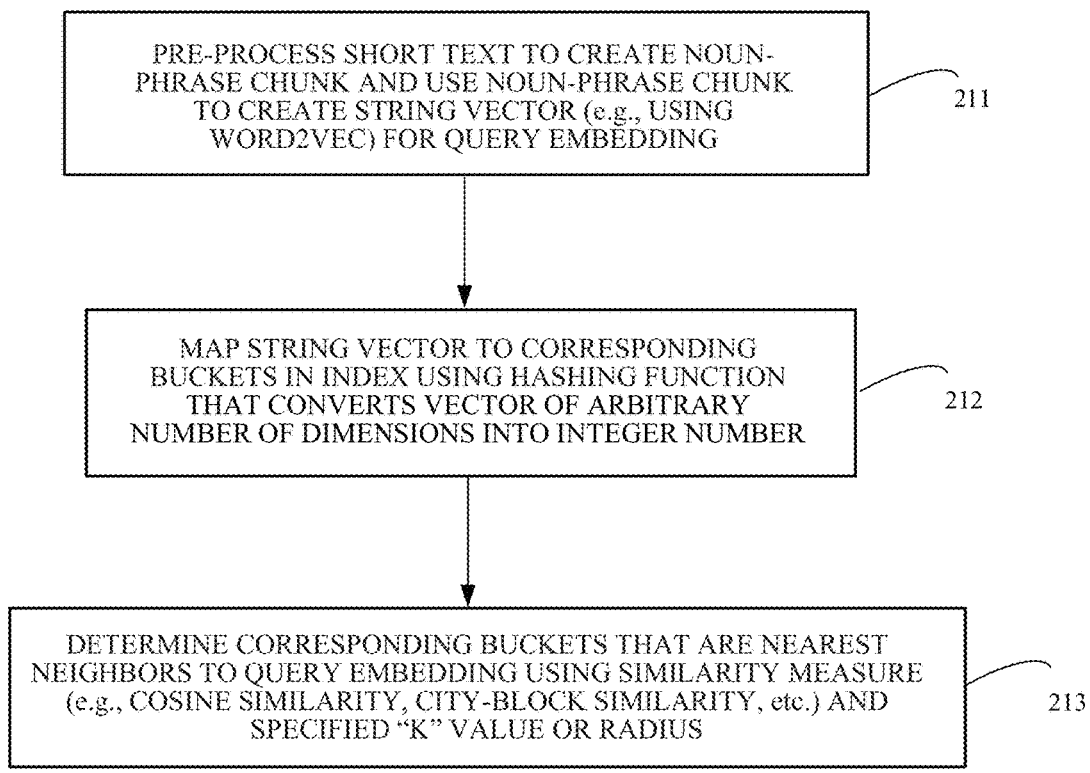
FIG. 2B is a flowchart diagram of a process for finding nearest-neighbor buckets in an LSH index, according to an example embodiment.

FIG. 2B is a flowchart diagram of a process for finding nearest-neighbor buckets in an LSH index, according to an example embodiment. In an example embodiment, some or all of the operations shown in this figure might be performed by client software running on mobile device 102, including, for example, a webpage with embedded JavaScript (or ActionScript) or an application such as a native app. It will be appreciated that this process provides further details as to operations 204 and 205 in FIG. 2A.

As depicted in FIG. 2B, the software (e.g., client software on the mobile device) pre-processes a short text to create a noun-phrase chunk and uses the noun-phrase chunk to create a query vector (e.g., using word2vec) for the query embedding, in operation 211. In an example embodiment, the software might filter stop (or common) words when creating the noun-phrase chunk. Other pre-processing of the short text might include removing function words or stemming, in an example embodiment. In operation 212, the software (e.g., client software on the mobile device) maps the string vector to corresponding buckets in the index using a hashing function that converts a vector of an arbitrary number of dimensions into an integer number. Here it will be appreciated that the corresponding buckets in the index are the buckets that share the same hash signature as the string vector. Such a hashing function is provided by TarsosLSH. In operation 213, the software (e.g., client software on the mobile device) determines the corresponding buckets that are nearest neighbors to the string vector using a similarity measure (e.g., cosine similarity, city-block similarity, etc.) and a specified "k" value or radius. Here again, TarsosLSH allows the selection of a "k" value to be used for k-nearest-neighbor search.

Figure 4:
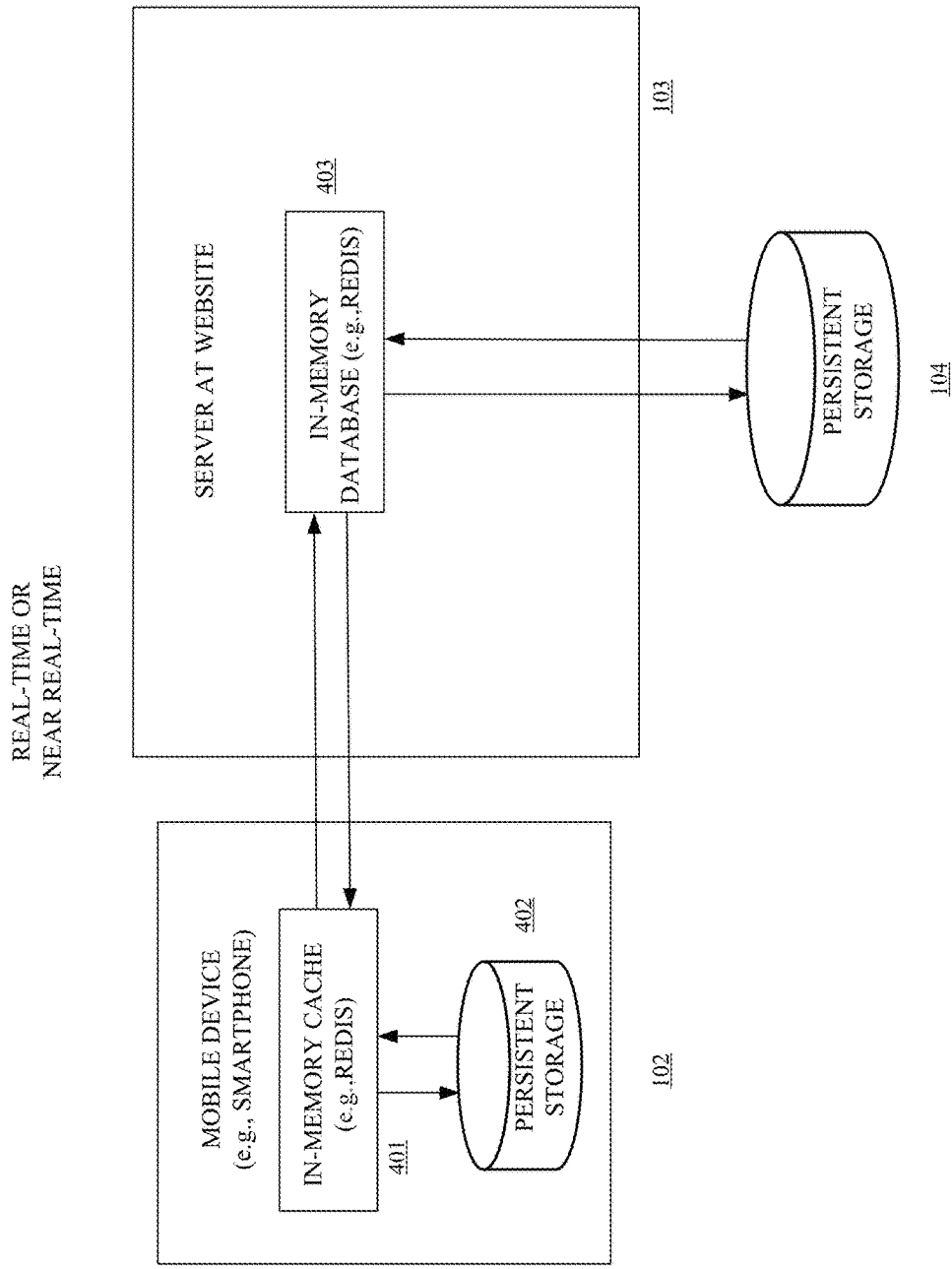
FIG. 4 depicts a mobile device with an in-memory cache backed by an in-memory database on a website server, in accordance with an example embodiment.

FIG. 4 depicts a mobile device with an in-memory cache backed by an in-memory database at a website, in accordance with an example embodiment. As depicted in the figure, the mobile device 102 has an in-memory cache 401 of key-value pairs. In an example embodiment, a bucket's hash signature might be the key and the bucket (e.g., a linked list of word/phrase embeddings) might be the value. Also, in an example embodiment, the in-memory cache 401 might be created using open-source software, such as Redis, which supports the use of abstract data types (ADTs) other strings. On the mobile device 102, the in-memory cache 401 might be backed by persistent storage 402, which is often relatively small in size, and an in-memory database 403 of key-value pairs on website 103. Here again, in-memory database 403, a bucket's hash signature might be the key and the bucket (e.g., a linked list of word/phrase embeddings) might be the value, in an example embodiment. The in-memory database 403 might also be created using open-source software, e.g., Redis, and it might be backed by persistent storage 104.

In an example embodiment, in-memory database 403 on website 103 might include the entire index of buckets (e.g., approximately 20-30 buckets with 200-300 string vectors per bucket) created in operation 201. By contrast, the in-memory cache 401 on the mobile device 102 might include a relatively small portion of the entire index of buckets (e.g., approximately 5-10 buckets with 20-30 string vectors per bucket) in the in-memory database 403. Here it will be recalled that the configurable parameters for TarsosLSH include number of buckets and bucket size (e.g., in terms of number of string vectors per bucket).

In an example embodiment, the buckets on the mobile device 102 and their contents might be determined on the basis of frequency of access, with eviction of least-recently-used (LRU) keys and their corresponding values. When a query vector is mapped to corresponding buckets in the index in operation 205, the software on the mobile device 102 might determine whether there is a cache hit with respect to a corresponding bucket in the in-memory cache 401. If there is, the software might conduct a nearest-neighbor search of the corresponding buckets in the cache. If there is a cache miss, the software might obtain the missing bucket from the in-memory database 403 on website 103 before conducting a nearest-neighbor search of the corresponding buckets. It will be appreciated that a cache miss will result in an additional expenditure of time to retrieve the missing bucket. However, in an example embodiment, all of these operations might be performed in real-time or near real-time, including the operations performed in the event of a cache miss.

Figure 5:
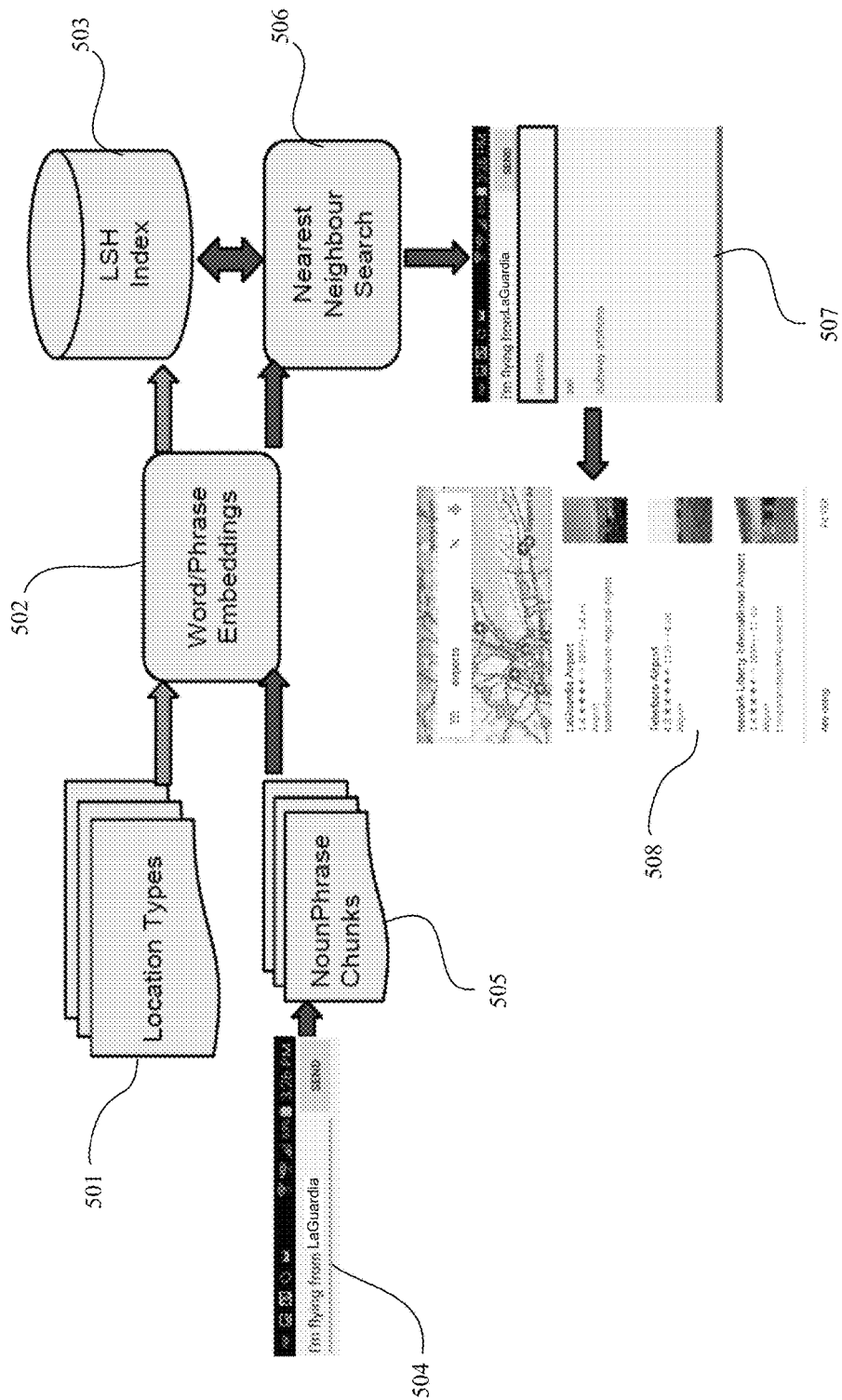
FIG. 5 depicts a view in a graphical user interface (GUI) that is used to receive a short text and a view in the GUI that displays entities in a geographic location that correspond to the short text, in accordance with an example embodiment.

FIG. 5 depicts a view in a graphical user interface (GUI) on a mobile device that is used to receive a short text and a view in the GUI that displays entities in that geographic location that correspond to the short text, in accordance with an example embodiment. The top part of the figure shows how an LSH index 503 of buckets might be created offline using word/phrase embeddings 502 (e.g., string vectors) derived from a corpus of documents 501 describing location entities, in an example embodiment.

The bottom part of the figure shows how a query embedding might be created and used to access the LSH index 503, in real-time or near real-time. The query embedding begins with a short text entered in a messaging view 504 in the GUI. Noun-phrase chunks 505 might then be extracted from the short text and used to generate a word/phrase embedding 502 (e.g., a query embedding), e.g., using a program such as word2vec. The query embedding might then be mapped to corresponding buckets in the LSH index 503 (e.g., a cache of the LSH index on the mobile device) which are searched for nearest neighbors using a similarity measure. In an example embodiment, the location types (e.g., "airports", "taxi", "subway stations") associated with the nearest neighbors might be displayed in GUI view 507. Upon receiving a selection (e.g., "airports") of a location type by the user through GUI view 507, the entities in the selected location type might be ranked in terms of proximity to the mobile device, using a mapping app, as discussed above with respect to operation 206 in FIG. 2A. Those rankings might then be used to determine prominence when displaying the entities, e.g., with the highest ranked entity on top (e.g., "LaGuardia Airport"), followed by the next highest ranked entity (e.g., "Teterboro Airport"), etc.

Figure 6:
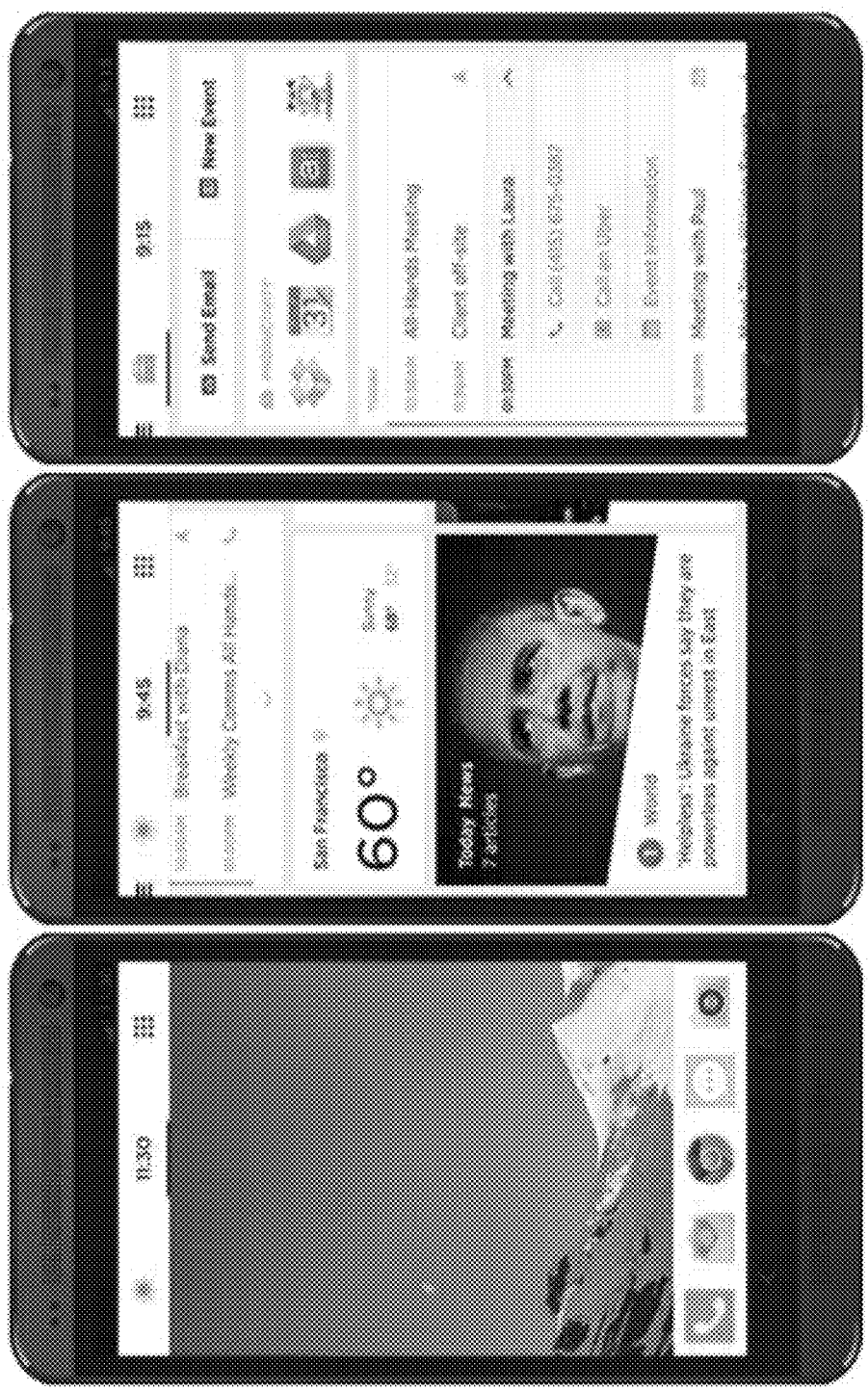
FIG. 6 depicts a homescreen (or app launcher) that uses short-text services provided by a website, in accordance with an example embodiment.

FIG. 6 depicts an intelligent homescreen (or app launcher) that uses short-text services provided by a website, in accordance with an example embodiment. A traditional homescreen is static and does not change its content during the course of a day. The intelligent homescreen (e.g., Aviate by Yahoo!) depicted in FIG. 6 adjusts its content during the course of a day according to a user's past behavior. Thus, early in the day, the intelligent homescreen might display the content in view 601, which includes no short texts. Later in the day, the intelligent homescreen might display the content in view 602, which includes two short texts in the form of calendar events ("Breakfast with Diana" and "Weekly Comms All Hands") at the top of the view. Even later in the day, the intelligent homescreen displays a view 603 with other short texts in the form of calendar events (e.g., "All-Hands Meeting", "Client off-site", "Meeting with Laura", and "Meeting with Paul"). It will be appreciated that a calendar event such as "Breakfast with Diana" might be used by the processes described above to recommend breakfast restaurants in the vicinity of the mobile device close to the time (e.g., "10:30 AM") of the calendar event. In an example embodiment, some or all of these recommended breakfast restaurants might be advertisers who compensate the website that provides the short text services.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the query might be based on a short text created with voice-recognition software or on a relatively longer text (e.g., a document). Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising operations of:
creating an index of a plurality of buckets for locality sensitive hashing (LSH), wherein each bucket includes one or more word or phrase embeddings derived from a corpus of documents that describe entities associated with geographic locations;
storing the index in an in-memory database of key-value pairs;
creating, on a mobile device, a cache backed by the in-memory database, wherein the cache is in-memory;
using a short text to create a query embedding;
mapping the query embedding to corresponding buckets in the index and determining which of the corresponding buckets are nearest neighbors to the query embedding using a similarity measure;
displaying location types associated with each of the buckets that are nearest neighbors in a view in a graphical user interface (GUI) on the mobile device and receiving a user selection as to one of the buckets; and
displaying the entities for a selected location type in a GUI view on the mobile device, wherein each operation is performed by one or more processors.

2. The method of claim 1, wherein the operations involving the query embedding are performed in real-time or near real-time.

3. The method of claim 1, wherein the one or more word or phrase embeddings are derived from the corpus using a continuous distribution model.

4. The method of claim 3, wherein the continuous distribution model is a continuous hag-of-words model or a continuous skip-gram model.

5. The method of claim 4, further comprising an operation of ranking the entities for the selected location type according to geographical proximity to the mobile device, using a mapping app that uses a geo-location or a geo-position for the mobile device.

6. The method of claim 5, further comprising an operation of using rankings to determine prominence when displaying the entities.

7. The method of claim 1, wherein the short text is from a text message, an email, a calendar event, or a to-do list.

8. The method of claim 1, wherein a particular geographic location of said geographic locations is a geo-location or geo-position associated with the mobile device.

9. The method of claim 1, wherein said similarity measure uses one or more of cosine: similarity, city-block similarity, and Euclidian similarity.

10. One or more non-transitory computer-readable media persistently, storing instructions that, when executed by a processor, perform the following operations:
creating an index of a plurality of buckets for locality sensitive hashing (LSH), wherein each bucket includes one or more word or phrase embeddings derived from a corpus of documents that describe entities associated with geographic locations;
storing the index in an in-memory database of key-value pairs;
creating, on a mobile device, a cache backed by the in-memory database, wherein the cache is in-memory;
using a short text to create a query embedding;
map the query embedding to corresponding buckets in the index and determine which of the corresponding buckets are nearest neighbors to the query embedding using a similarity measure;
display location types associated with each of the buckets that are nearest neighbors in a view in a graphical user interface (GUI) on the mobile device and receive a user selection as to one of the buckets; and
display the entities for a selected location type in a GUI view on the mobile device.

11. The non-transitory computer-readable media of claim 10, wherein the operations involving the query embedding are performed in real-time or near real-time.

12. The non-transitory computer-readable media of claim 10, wherein the one or more word or phrase embeddings are derived from the corpus using a continuous distribution model.

13. The non-transitory computer-readable media of claim 12, wherein the continuous distribution model is a continuous bag-of-words model or a continuous skip-gram model.

14. The non-transitory computer-readable media of claim 13, further comprising an operation of ranking the entities for the selected location type according to geographical proximity to the mobile device, using a mapping app that uses a geo-location or a geo-position for the mobile device.

15. The non-transitory computer-readable media of claim 14, further comprising an operation of using rankings to determine prominence when displaying the entities.

16. The non-transitory computer-readable media of claim 10, wherein the short text is from a text message, an email, a calendar event, or a to-do list.

17. The non-transitory computer-readable media of claim 10, wherein a particular geographic location of said geographic locations is a geo-location or a geo-position associated with the mobile device.

18. The non-transitory computer-readable media of claim 10, wherein the similarity is one or more of cosine similarity, city-block similarity, and Euclidian similarity.

19. A method, comprising operations of:
creating an index of a plurality of buckets for locality sensitive hashing (LSH), wherein each bucket includes one or more word or phrase embeddings derived, using a continuous distribution model, from a corpus of documents that describe entities associated with geographic locations;
storing the index in an in-memory database of key-value pairs;
creating, on a mobile device, a cache backed by the in-memory database, wherein cache is in-memory;
using a short text to create a query embedding;
mapping the query embedding to corresponding buckets in the index and determining which of the corresponding buckets are nearest neighbors to the query embedding using cosine similarity, city-block similarity, or Euclidian similarity;

displaying location types associated with each of the buckets that are nearest neighbors in a view in a graphical user interface (GUI) on the mobile device and receiving a user selection as to one of the buckets; and displaying the entities for a selected location type in a GUI view on the mobile device, wherein the each operation is performed by one or more processors.

20. The method of claim 19, wherein the operations involving the query embedding are performed in real-time or near real-time.

\* \* \* \* \*